(12) United States Patent
Kopanski et al.

(10) Patent No.: US 11,161,283 B2
(45) Date of Patent: Nov. 2, 2021

(54) MOLDING FASTENER PRODUCTS

(71) Applicant: Velcro IP Holdings LLC, Manchester, NH (US)

(72) Inventors: Gregory K. Kopanski, Candia, NH (US); Paul M. Siemiesz, New Boston, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 420 days.

(21) Appl. No.: 16/226,971

(22) Filed: Dec. 20, 2018

(65) Prior Publication Data

US 2020/0198192 A1 Jun. 25, 2020

(51) Int. Cl.
| | |
|---|---|
| *B29C 43/22* | (2006.01) |
| *B29C 43/24* | (2006.01) |
| *B29C 43/28* | (2006.01) |
| *B29C 43/46* | (2006.01) |
| *B29K 23/00* | (2006.01) |
| *B29L 31/00* | (2006.01) |

(52) U.S. Cl.
CPC ............ *B29C 43/222* (2013.01); *B29C 43/24* (2013.01); *B29C 43/28* (2013.01); *B29C 43/46* (2013.01); *B29C 2043/465* (2013.01); *B29K 2023/12* (2013.01); *B29L 2031/729* (2013.01)

(58) Field of Classification Search
CPC .............. B29C 43/46; B29C 2043/465; B29C 2043/461; B29C 48/35
See application file for complete search history.

(56) References Cited

U.S. PATENT DOCUMENTS

| | | | | |
|---|---|---|---|---|
| 5,345,659 A | * | 9/1994 | Allan | A43B 11/00 24/442 |
| 5,851,467 A | | 12/1998 | Murasaki | |
| 5,945,131 A | * | 8/1999 | Harvey | B29C 48/92 425/141 |
| 6,687,962 B2 | | 2/2004 | Clarner et al. | |
| 6,692,674 B1 | | 2/2004 | Kurtz, Jr. et al. | |

(Continued)

FOREIGN PATENT DOCUMENTS

| | | |
|---|---|---|
| EP | 2679112 A1 | 1/2014 |
| WO | WO 2005/090045 A1 | 9/2005 |
| WO | WO 2005/090046 A1 | 9/2005 |

OTHER PUBLICATIONS

PCT International Search Report and Written Opinion in International Application No. PCT/EP2019/086181, dated Apr. 23, 2020, 14 pages.

(Continued)

*Primary Examiner* — Jacob T Minskey
*Assistant Examiner* — Virak Nguon
(74) *Attorney, Agent, or Firm* — Fish & Richardson P.C.

(57) ABSTRACT

A method of molding resin on a flexible substrate includes forming discrete regions of resin and forcing resin of at least some of the regions into molding cavities to form a respective array of resin projections extending from a resin base of the regions. Forming the discrete regions of resin includes depositing molten resin directly onto either the substrate or a surface in which the cavities are defined. The resin is deposited as the substrate moves in a processing direction, and the resin is deposited by resin sources spaced from each other along the processing direction.

44 Claims, 10 Drawing Sheets

(56) References Cited

U.S. PATENT DOCUMENTS

| | | | |
|---|---|---|---|
| 7,037,457 B2 * | 5/2006 | Seidel | B29C 43/222 |
| | | | 264/220 |
| 7,048,818 B2 | 5/2006 | Krantz et al. | |
| 7,056,462 B2 | 6/2006 | Provost et al. | |
| 7,214,334 B2 | 5/2007 | Jens et al. | |
| 7,244,382 B2 | 7/2007 | Tachauer et al. | |
| 7,438,847 B2 | 10/2008 | Clune et al. | |
| 7,556,405 B2 * | 7/2009 | Kingsford | H05K 1/0284 |
| | | | 361/600 |
| 2001/0016245 A1 | 8/2001 | Tuman et al. | |
| 2004/0094860 A2 * | 5/2004 | Jens | B29C 43/222 |
| | | | 264/166 |
| 2005/0101930 A1 * | 5/2005 | Tachauer | A61F 13/622 |
| | | | 604/391 |
| 2005/0217087 A1 * | 10/2005 | Gallant | A44B 18/0061 |
| | | | 24/452 |
| 2005/0280175 A1 * | 12/2005 | Tachauer | B29C 43/222 |
| | | | 264/167 |
| 2006/0101626 A1 * | 5/2006 | Gallant | A44B 18/0049 |
| | | | 24/442 |
| 2008/0050553 A1 * | 2/2008 | Tuma | B29C 43/222 |
| | | | 428/99 |
| 2008/0060173 A1 | 3/2008 | Zhang et al. | |

OTHER PUBLICATIONS

PCT International Preliminary Report on Patentability in International Appln. No. PCT/EP2019/086181, dated Dec. 11, 2020, 18 pages.

* cited by examiner

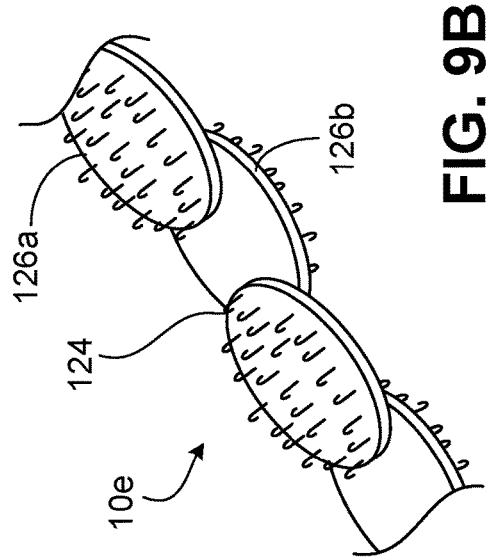
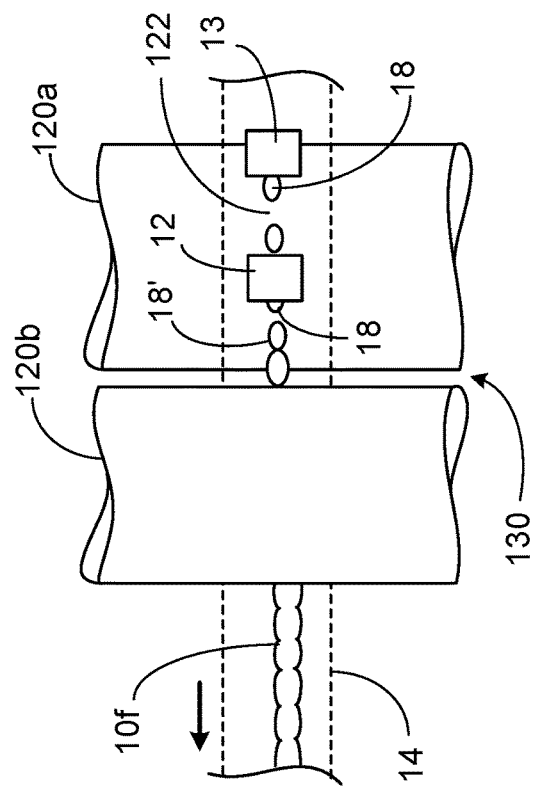
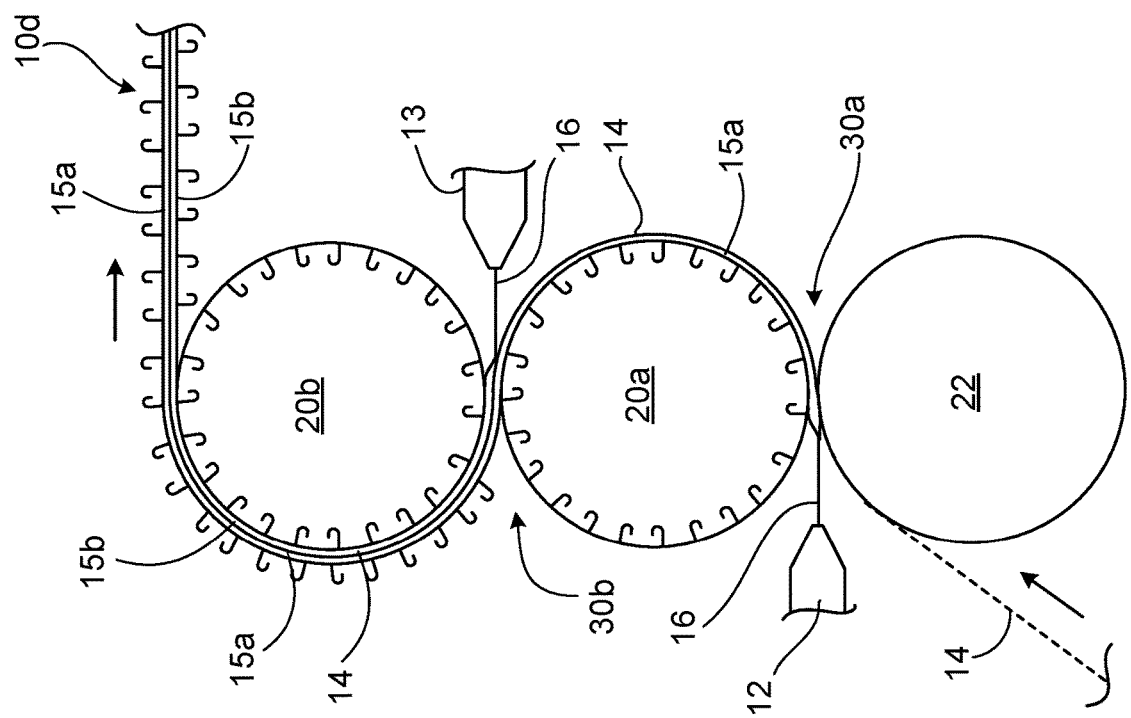

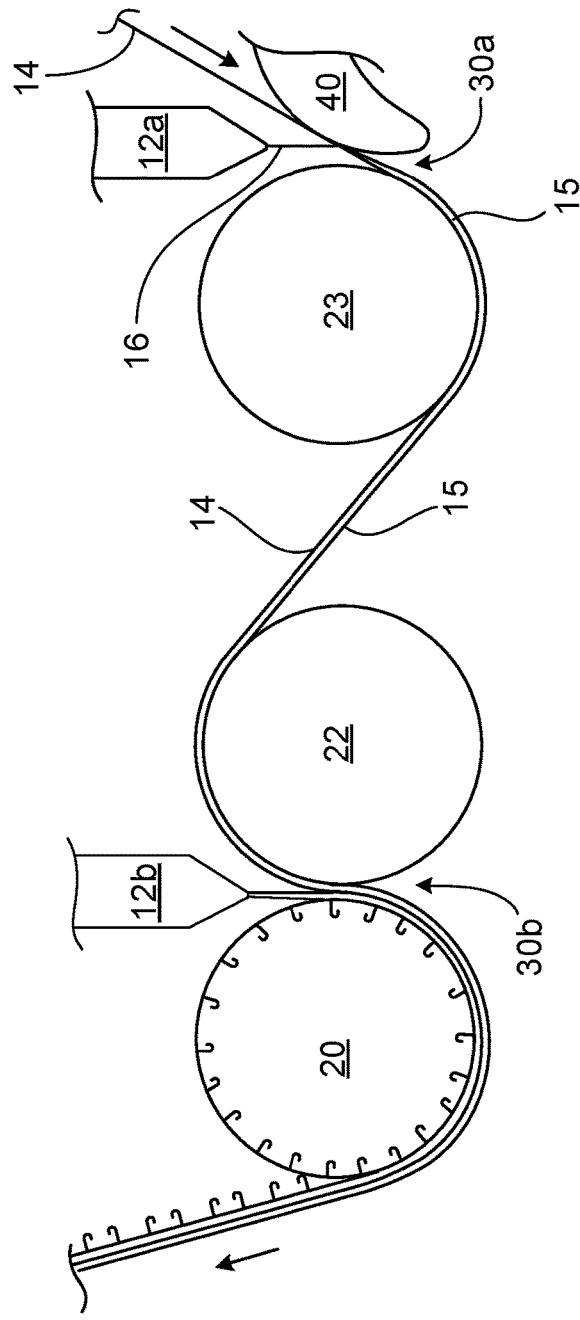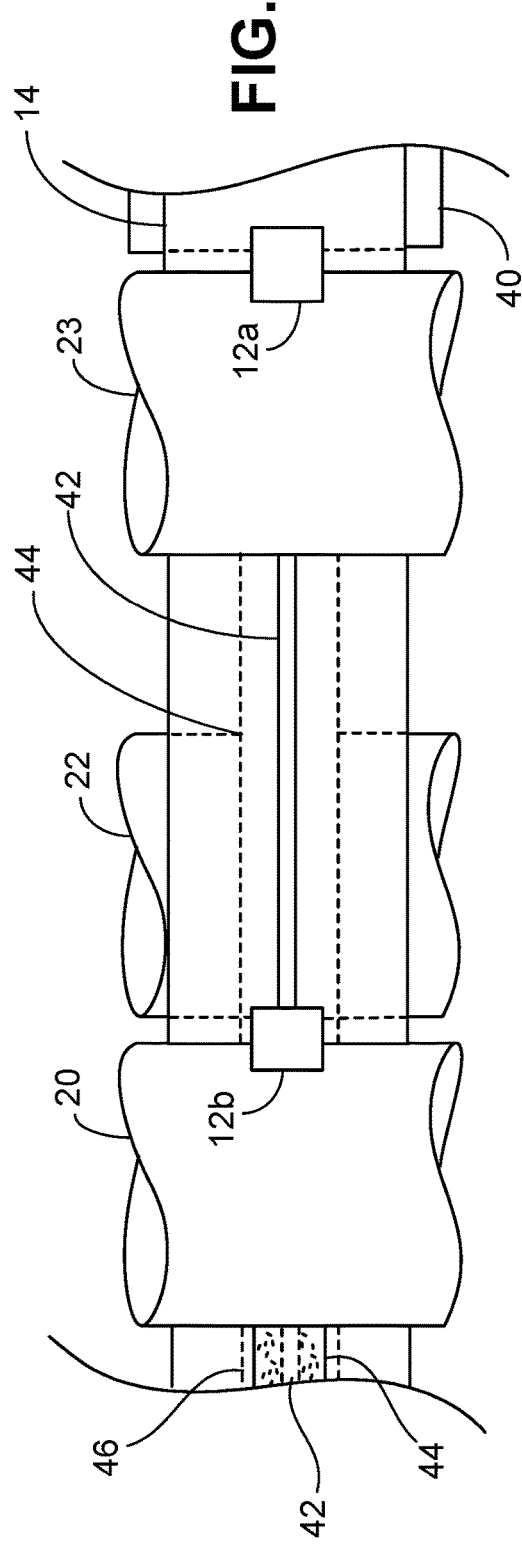

MOLDING FASTENER PRODUCTS

TECHNICAL FIELD

This invention relates to molding resin to form fastener products such as on a substrate, and more particularly to molding resin regions in multiple stages along a substrate.

BACKGROUND

Arrays of touch fastener elements, e.g., loop-engageable hooks, may be molded on a surface of a flexible sheet-form substrate, such as by passing the substrate through a molding nip with moldable resin, and forcing the resin into cavities to form fastener elements. Such methods can be performed so as to form discrete islands of resin in some regions of the substrate, each island having respective fastener elements extending therefrom. Improvements in the methods of making such products are sought.

SUMMARY

One aspect of the invention features a method of molding resin on a flexible substrate. The method includes forming discrete regions of resin and forcing resin of at least some of the regions into molding cavities to form a respective array of resin projections extending from a resin base of the at least some of the regions. Forming the discrete regions of resin includes depositing molten resin directly onto either the substrate or a surface in which the cavities are defined. The resin is deposited as the substrate moves in a processing direction, and the resin is deposited by resin sources spaced from each other along the processing direction.

In some implementations, forming the discrete regions of resin includes depositing interrupted streams of molten resin. In some cases, the discrete regions of resin include discrete resin islands spaced from each other in the processing direction.

In some examples, the discrete regions of resin include longitudinally continuous resin lanes spaced from each other in a lateral direction, perpendicular to the processing direction.

In some cases, forming the discrete regions of resin includes depositing molten resin directly onto the substrate and then introducing the deposited resin to a mold roll defining the molding cavities.

In some implementations, the resin sources are offset with respect to each other, and forming discrete regions of resin includes forming regions staggered along a lateral direction of the substrate, perpendicular to the processing direction.

In some examples, forming the discrete regions of resin includes depositing interrupted streams of resin by resin sources spaced from each other along a lateral direction, perpendicular to the processing direction.

In some configurations, the resin projections include fastener elements.

In some embodiments, each resin source of the resin sources is independently movable with respect to proximity to the substrate.

In some cases, a resin deposited by a first resin source of the resin sources includes a different density than a resin deposited by a second resin source of the resin sources.

In some implementations, the method further includes, before forcing resin of the regions into the molding cavities, heating the resin to maintain the resin at a desired temperature until the resin is forced into the molding cavities. In some examples, forming the discrete regions of resin includes depositing molten resin directly onto the substrate. In some examples, the method further includes, before forcing resin of the regions into the molding cavities, cooling the resin to mechanically secure resin to the substrate, and winding the flexible substrate to form a wound roll.

In some cases, forming the discrete regions of resin includes depositing molten resin directly onto the substrate. In such cases, the resin is forced into the cavities in one or more molding nips defined against one or more mold rolls in which the cavities are defined. In some embodiments, depositing molten resin onto the substrate includes depositing molten resin onto the substrate before the resin contacts the one or more mold rolls. In some implementations, each of the one or more molding nips is defined between a mold roll and a respective reaction surface. In some examples, the reaction surface includes a counter-rotating pressure roll. In some cases, the reaction surface includes a pressure shoe having a generally stationary outer surface.

In some cases, the method can further include, after forcing resin of the regions into the molding cavities, solidifying resin of the regions in the filled molding cavities, and stripping the solidified resin of the regions from a peripheral surface of the one or more mold rolls by pulling the projections from their cavities.

In some embodiments, forming discrete regions of resin on the flexible substrate and forcing resin of the regions into molding cavities includes depositing a first quantity of resin at a first deposition location along the processing direction, depositing a second quantity of resin at a second deposition location along the processing direction, and then passing the substrate through a pressure zone in which pressure applied through the substrate forces resin from at least one of the first and second quantities of resin into the molding cavities. In some examples, the second quantity of resin is deposited to overlap the first quantity of resin. In some cases, the cavities are filled with resin from only the second quantity of resin. In some embodiments, resin from both the first and second quantities of resin is forced into molding cavities in the pressure zone. In some implementations, resin from the first quantity of resin is forced exclusively into a first set of the molding cavities, and resin from the second quantity of resin is forced exclusively into a second set of the molding cavities. In some examples, the pressure zone is defined in the molding nip, the molding nip being defined between a pressure roll and a mold roll in which the cavities are defined. In some implementations, the pressure zone is defined between the mold roll and a belt supported by the pressure roll to engage the mold roll through resin in the pressure zone. In some cases, the method further includes, before forcing resin of the regions into the molding cavities, heating the first and second quantities of resin to maintain the resin at a desired temperature until resin from at least one of the first and second quantities of resin is forced into the molding cavities. In some embodiments, heating the first and second quantities of resin includes heating the pressure roll to transfer heat from the pressure roll to the resin through the substrate. In some examples, the resin is in contact with the mold roll through a circumference angle of at least 180 degrees. In some implementations, heating the first and second quantities of resin includes heating the substrate upstream of initial contact between the substrate and the pressure roll. In some cases, heating the first and second quantities of resin includes using a heat source disposed over the first and second quantities of resin, opposite the pressure roll.

In some examples, forming discrete regions of resin on the flexible substrate and forcing resin of the regions into molding cavities includes depositing a first quantity of resin at a first deposition location along the processing direction, passing the substrate through a first pressure zone in which pressure applied through the substrate forces resin from the first quantity of resin into a first set of molding cavities, depositing a second quantity of resin at a second deposition location along the processing direction, and then passing the substrate through a second pressure zone in which pressure applied through the substrate forces resin from the second quantity of resin into a second set of molding cavities. In some implementations, the second quantity of resin is deposited to overlap the first quantity of resin. In some cases, the first and second pressure zones are defined in respective first and second molding nips, each molding nip is defined between a reaction surface and a mold roll in which the cavities are defined. In some embodiments, the mold roll that defines the second molding nip is configured to knockdown resin projections formed in the first molding nip. In some cases, the mold roll defining the second molding nip defines a circumferential groove along its periphery such that, as the substrate approaches the second molding nip, resin projections formed in the first molding nip are disposed within the groove. In some examples, depositing a first quantity of resin includes depositing a third quantity of resin at a third location aligned with the first location along the processing direction, and passing the substrate through a first pressure nip includes passing the substrate through a third pressure nip aligned with the first pressure nip. In some implementations, the third pressure nip is defined in a third molding nip, the third molding nip being defined between a third reaction surface and a third mold roll spaced apart from a mold roll of the first molding nip. In some embodiments, depositing the first quantity of resin includes depositing resin onto a first side of the substrate, and depositing the second quantity of resin includes depositing resin onto a second side of the substrate, opposite the first side of the substrate. In some cases, the regions of resin are formed in a symmetrical arrangement with respect to a central axis of the substrate extending parallel to the processing direction. In some examples, forcing the resin into the molding cavities includes continuously melting a portion of the substrate in the first molding nip, such that the molten resin and the melted portion of the substrate together form a band of resin free of meld lines, and depositing a second quantity of resin includes depositing resin over the band of resin. In some implementations, passing the substrate through the first pressure zone includes laminating resin from the first quantity of resin to the substrate and leaving resin of the laminated resin unmolded. In such implementations, the second quantity of resin is deposited to overlap the unmolded resin.

Another aspect of the invention features a continuous method of forming a touch fastener product. The method includes sequentially forming first regions of resin at a first location along a processing direction, such that the first regions of resin are spaced apart in the processing direction to define gaps therebetween. The method also includes forming second regions of resin at a second location downstream from the first location along the processing direction, the second regions of resin overlaying the gaps defined between the first regions of resin. The method also includes forcing resin of at least some of the regions into molding cavities of a rotating mold roll to form resin projections. The method also includes joining the first and second regions to form a longitudinally continuous strip of resin, and then removing the longitudinally continuous strip of resin from the mold roll by stripping the projections from the cavities.

In some implementations, forming the first regions of resin includes forming discrete islands of resin spaced from each other in the processing direction.

In some cases, forming the first regions of resin includes forming longitudinally continuous lanes of resin spaced from the second regions of resin in a lateral direction, perpendicular to the processing direction.

In some examples, forming the first regions of resin includes depositing resin directly onto a substrate.

In some embodiments, forming the first regions of resin includes depositing resin directly onto a surface of the mold roll.

In some implementations, forcing resin of the at least some of the regions into the molding cavities includes introducing the resin into a pressure nip including the mold roll.

In some examples, forming the second regions of resin includes forming regions of resin that contact the first regions of resin.

Forming islands or lanes as a continuous product or laminated on a substrate can be advantageously performed by resin dispensers that are separated along a processing direction. Molding resin by multiple resin dispensers that are separated along a processing direction allows different types of resin to be molded one quantity on top of another or as continuous lanes. Such configuration can also allow resin islands to be formed in a staggered configuration on a substrate. Moreover, resin islands or lanes formed by such resin dispensers can also be connected at a pressure nip to form a longitudinally continuous product of linked resin islands. The resin can be molded in one nip or in multiple molding nips, where one or more dispensers deposit resin on each molding nip. Molding resin in multiple molding nips can be advantageous in reducing nip pressure at the molding nip, which may avoid roll deflection over wide products.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9A is a schematic illustration of an apparatus and method for forming a fastener product with projections on both sides of the product.

FIG. 9B is a perspective view of a portion of a touch fastener product formed on the apparatus of FIG. 9A FIG. 9C is a top view of an apparatus and method for forming a fastener product of linked islands.

FIG. 11 is a schematic illustration of an apparatus and method for molding resin islands on a flexible substrate according to a fifth implementation.

FIG. 12 is a top view of the apparatus of FIG. 11.

Like reference symbols in the various drawings indicate like elements.

DETAILED DESCRIPTION

Figure 1:
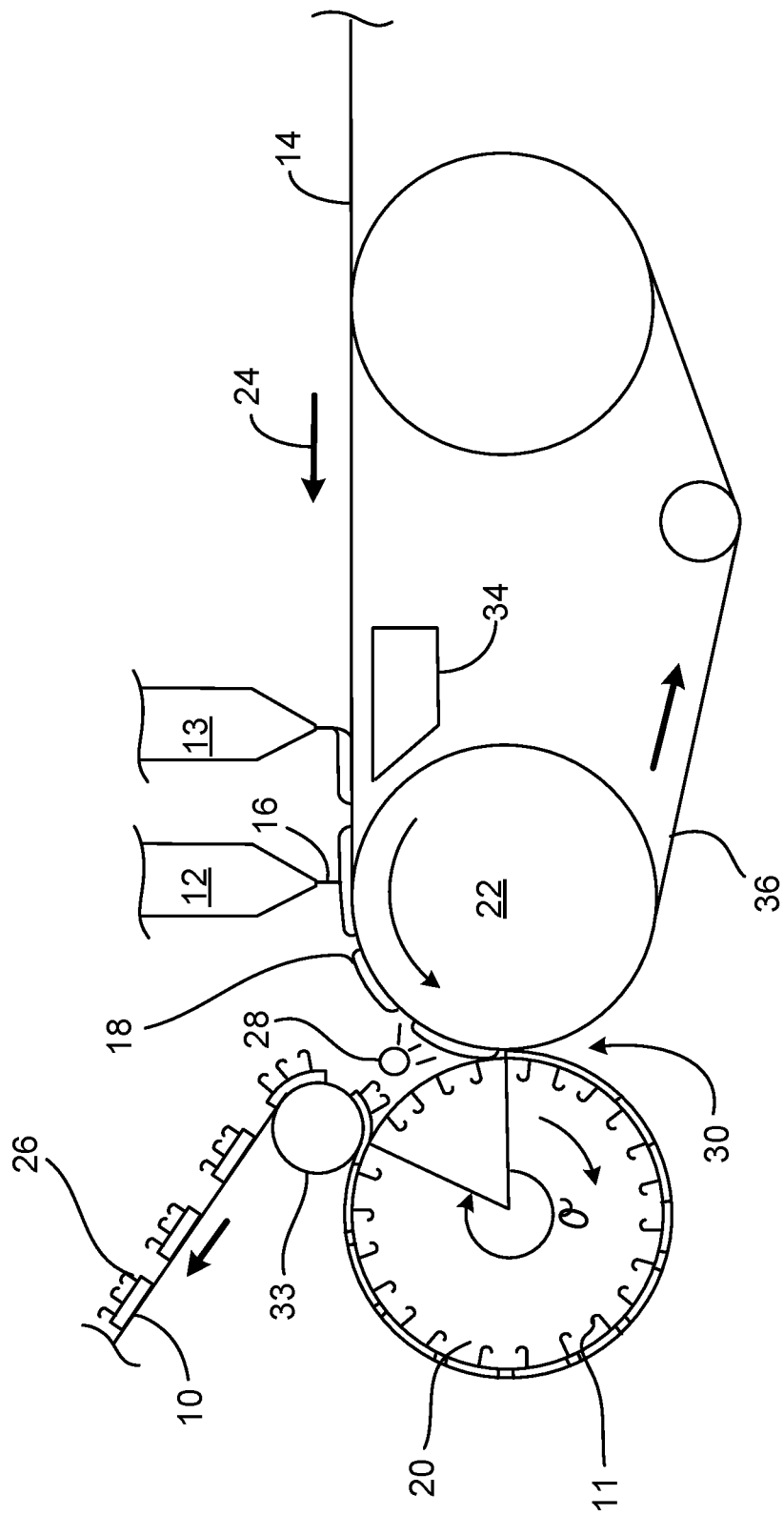
FIG. 1 is a schematic illustration of an apparatus and method for molding resin islands on a flexible substrate according to a first implementation.

Referring to FIG. 1, a method and apparatus for manufacturing a fastener product 10 features multiple resin sources 12 and 13 spaced apart along a processing direction 24 to form discrete regions 18 (e.g., islands or lanes) of resin 16 on a flexible, sheet-form substrate 14. Resin sources 12 and 13 may include resin dispensers such as the AG-900+S modular dispensing applicator, available from Nordson Corporation. The successive resin dispensers 12 and 13 are spaced from each other along the processing direction to deposit molten resin 16 on different locations of the substrate 14. Each of the resin dispensers 12 and 13 can deposit interrupted streams of resin onto substrate 14 as the substrate moves in the processing direction 24 to form regions 18 of resin 16 such as oval patches, strips, lanes, coins, and so forth. The first dispenser 13 deposits a first quantity of resin 16 at a first location of the substrate 14 along the processing direction 24, and the second dispenser 12 deposits a second quantity of resin 16 at a second location of the substrate, downstream of the first location along the processing direction 24. After the resin sources 12 and 13 deposit resin onto substrate 14, substrate 14 continues to move along the processing direction and is trained through a pressure nip or molding nip 30 formed between a mold roll 20 and a reaction surface 22 (e.g., a pressure roll). At least some of molten resin 16 of islands 18 is then forced into molding cavities 11 of the mold roll 20 under pressure applied through the substrate at nip 30. The molten resin 16 fills at least some of the cavities 11 of the mold roll 20 to form a respective array of resin projections extending from a resin base of each island 18. In many cases, the cavities 11 are each shaped to form overhanging fastener elements. In some other cases, the cavities are shaped to form straight stems without overhanging heads to be knock-down or deformed by a rotatable roller disposed downstream of the pressure nip 30, as further described in detail below with respect to FIG. 7B. After the resin 16 is forced into the cavities, the resin is chilled and solidified into fastener elements as the resin travels within the mold roll away from the nip 30. Nip pressure also laminates resin of the islands with the substrate 14, in some cases by forcing the moldable resin into pores of the substrate or by encapsulating surface features of the substrate, thereby forming resin bases permanently secured to the substrate surface.

Mold roll 20 may be chilled internally to allow the resin to solidify before being stripped away. Once the resin has sufficiently chilled, the substrate and solidified resin of each island is stripped from the mold roll surface about a stripping roll 33, and eventually spooled for shipment. As further discussed in detail below, the resin islands 18 may be heated by a heat source to prevent the resin from solidifying before entering the molding nip 30. Because of this additional heat source, the resin may require to be cooled for a longer period of time compared to resin that is introduced directly to the molding nip. For example, the resin is in contact with the mold roll 20 through a circumference angle 'θ' of at least 180 degrees.

Figure 2:
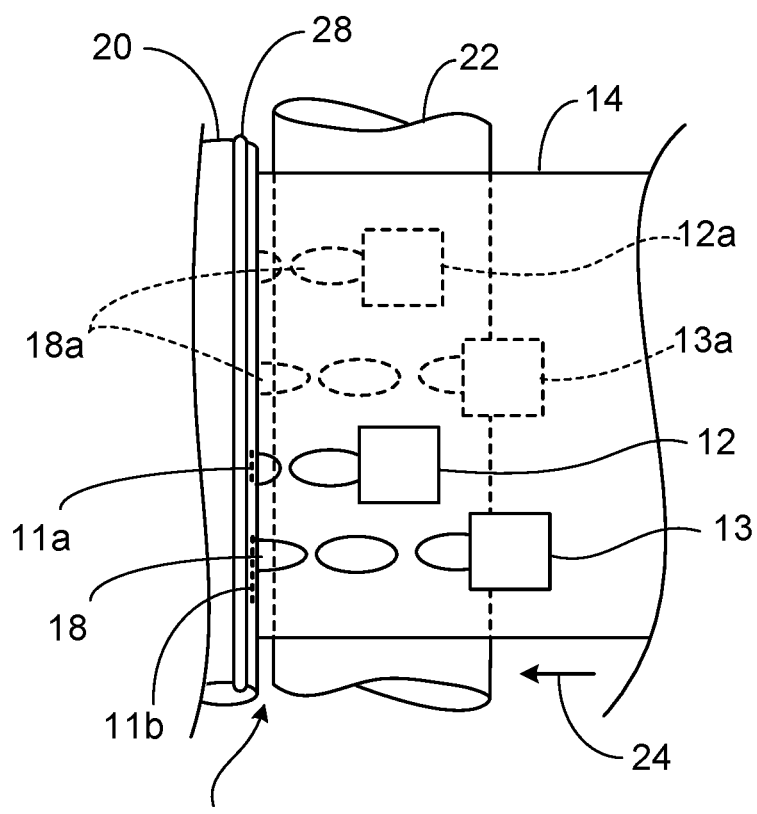
FIG. 2 is a top view of a portion of the apparatus of FIG. 1.

Referring also to FIG. 2, dispensers 12 and 13 can be disposed upstream of pressure nip 30 in a staggered configuration. Dispensers 12 and 13 are staggered along a cross-machine direction of the substrate 14 such that each dispenser operates on a different point across the width of substrate 14. The dispensers 12 and 13 can be synchronized with each other to deposit the streams or drops of resin at the same time to form staggered resin islands. In some implementations, additional resin dispensers 12a and 13a are spaced apart from dispensers 12 and 13 along a lateral direction, perpendicular to the processing direction (e.g., along the cross-machine direction of the substrate). The additional resin sources 12a and 13a can also be arranged in a staggered configuration to form a complementary array of staggered resin islands 18a to be molded in pressure nip 30.

Referring to FIG. 1 and FIG. 2, the end product 10 has solidified resin islands 26 or continuous resin lanes (shown in FIG. 7A) that can have different shapes and that can carry different types of fastener elements. For example, resin from the first quantity of resin deposited by dispenser 13 is forced exclusively into a first set 11a of the molding cavities, and resin from the second quantity of resin deposited by second dispenser 12 is forced exclusively into a second set 11b of the molding cavities. The first set 11a and second set 11b of cavities may include different molding cavities that form different types or shapes of male touch-fastener elements (e.g., J-shaped or mushroom-shaped elements), with different heights and widths. In some cases, resin disposed in each pressure nip can have a different color, density, and other mechanical properties. In some examples, only one set 11b of molding cavities can be filled with resin of the second quantity, and the resin of the first quantity can be just laminated to the substrate. In some implementations, the second resin source 12 can be aligned with the first resin source 13 along the processing direction 24, and the second quantity of resin can be deposited to 1) overlap the first quantity of resin or 2) to fill gaps between islands formed by the first resin source to form a continuous lane of linked islands.

As shown in FIG. 1, because dispensers 12 and 13 do not introduce resin directly into the pressure nip 30 and are disposed at a distance away from pressure nip 30, the resin 16 deposited on substrate 14 may begin to solidify before entering the pressure nip 30. To allow resin 16 to fill the molding cavities 11, the resin needs to be in a flowable or molten state. Resin may be re-melted or kept at a desired temperature by a heat source 28 disposed above the resin islands 18 opposite substrate 14. As shown in FIG. 2, heat source 28 can be a heated wire, a coiled heating element, or any type of conductor capable of transferring enough heat to the resin to maintain the resin at a desired temperature until the resin is forced into the molding cavities. In some examples, heat source 28 can instead or additionally include an infrared heating source, a heater, or another component capable of transferring heat to resin 16 through convection or radiation. Pressure roll 22 can additionally be heated to transfer heat to the resin through the belt 36 and the substrate 14. In most cases, an additional heat source 34 disposed under substrate 14 can transfer heat to resin 16 by heating substrate 14. For example, pressure roll 22 can support a belt 36 that, in cooperation with mold roll 20, forms the pressure nip 30 and engages the mold roll 20 through resin in the pressure nip 30. Belt 36 can be a screen (not shown) with raised surfaces (e.g., embossing features) that allows the screen to apply higher pressure at desired locations to mold resin with embossing characteristics or to form a resin base with smoother edges. Heat source 34 can include a radiant heater or a heating conductor similar to heater 28. Heat source 34 has a flat surface facing the belt 36 to heat the resin through belt 36 and substrate 14. In examples where the belt 36 includes a screen (e.g., a belt with holes), the screen allows the heat from heat source 34 to more effectively reach the back of the substrate. In some implementations and as further discussed in detail below with respect to FIG. 11, the streams of resin can melt the substrate at the pressure nip during the latency on the belt to form a 'window mesh' with resin islands forming windows on the substrate. Heat source 34 heats the substrate 14 upstream of initial contact between the substrate and the pressure roll 22 (sometimes with the belt between the substrate and the pressure roll).

As further discussed in detail below with respect to FIG. 13, each dispenser 12 and 13 is independently movable with respect to proximity to the substrate 14 to narrow the gap between the dispensers and the substrate 14. In some cases, the dispensers extend from a common manifold or structure that controls vertical and horizontal motion of the dispensers. In some implementations, the pressure roll 22 and mold roll 20 is movable with respect to proximity to the dispensers 12 and 13.

Figure 3:
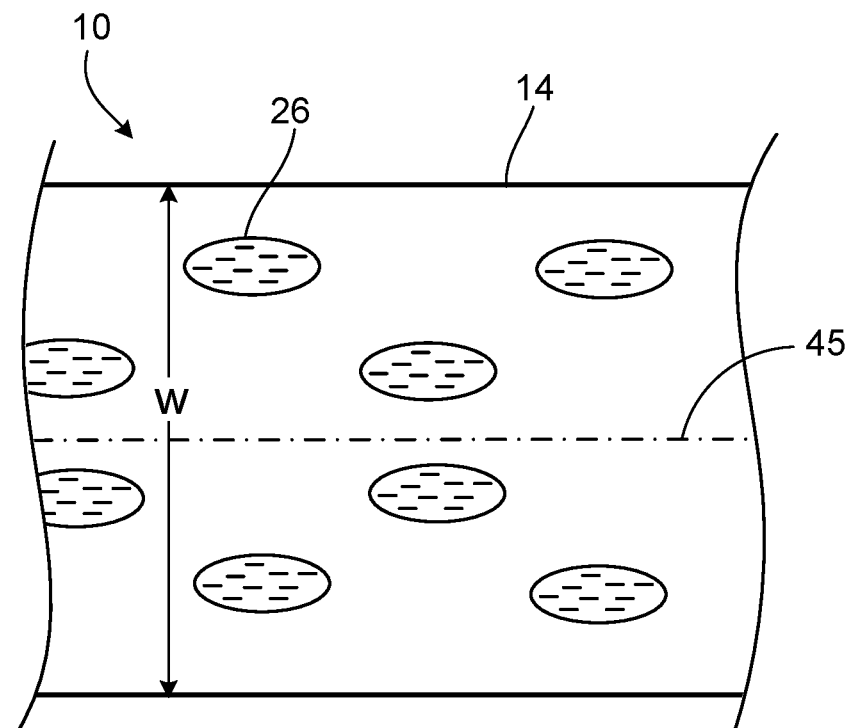
FIG. 3 is a top view of a portion of a fastener product formed on the apparatus of FIG. 1.

Referring to FIG. 3, the resin dispensers (shown in FIG. 2) can be arranged to form islands 26 in a symmetrical arrangement with respect to a central axis or plane 45 of the substrate that extends parallel to the processing direction. As further discussed in detail below with respect to FIG. 8, molding resin islands 26 in a symmetrical arrangement allows the substrate 14 to be processed without creasing or misaligning, especially when resin is molded in multiple, successive pressure nips. The substrate 14 may have a width 'w' of about 48 inches (1219 millimeters). Substrate 14 can be a textile (e.g., a woven material or a knit material) or a non-woven material. For example, substrate 14 may include a 35 GSM point bonded Spunbond-Meltblown-Spunbond (SMS). In some other cases, substrate 14 can include a fiberglass-reinforced Kraft paper. The molded resin can be the 1350 N—80% polypropylene resin available from Pinnacle Polymers, or the hybrid Vistamaxx 6202 available from ExxonMobil.

Figure 4:
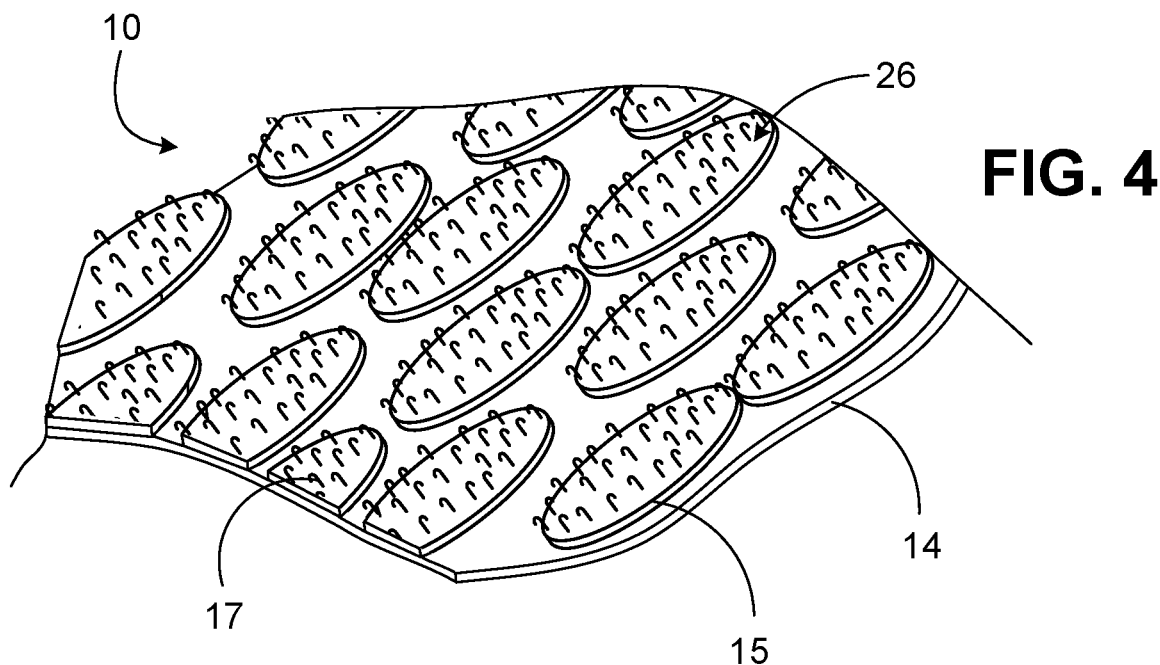
FIG. 4 is a perspective view of a portion of a fastener product formed on the apparatus of FIG. 1.

Referring to FIG. 4, the fastener product 10 molded in the apparatus of FIG. 1 features flexible substrate 14 carrying discrete islands 26 (e.g., elongated patches) that define thin resin bases 15 with an array of fastener elements 17 extending therefrom. Each island 26 is spaced from all adjacent islands. In this example, the islands are staggered to preclude any straight inter-island gap extending across an entire width of the substrate 14. In some cases, the islands 26 are arranged to preclude any straight inter-island gap extending across an entire extent of the substrate in any direction. Islands 26 can have an oval shape, a circular shape, a square shape, or a different shape formed by the resin dispensers and the pressure nip. As adjacent islands 26 are formed in a staggered configuration, alternating islands may nest to cover up to about 90 percent of the surface of the substrate.

Figure 5:
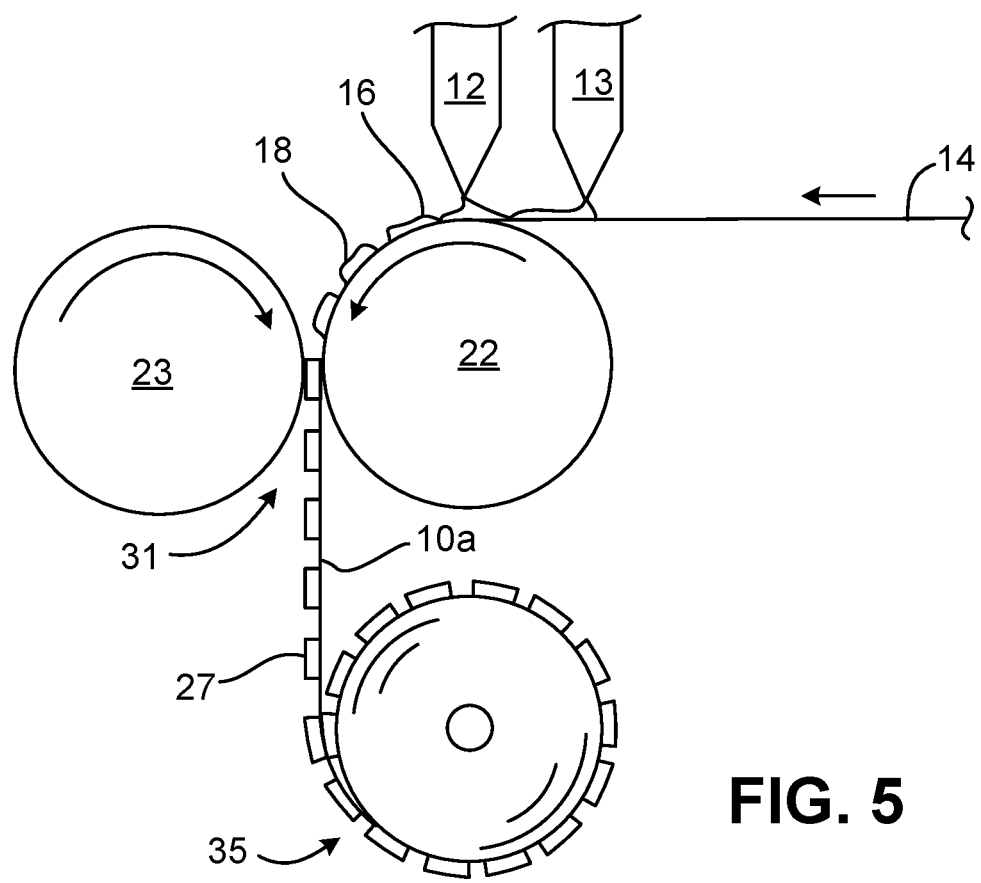
FIG. 5 is a schematic illustration of an apparatus and method for forming resin islands on a flexible substrate and winding the substrate to form a wound roll.

Referring now to FIG. 5, the islands 18 of molten resin 16 can be laminated onto the substrate 14 (e.g., impregnated or encapsulated within pores of the substrate) prior to molding the resin. For example, the resin 16 can be laminated to the substrate by pressure at a pressure nip 31 formed between two pressure rolls 22 and 23. The resin is laminated to form a laminated product 10a of discrete islands 27 that do not have fastener hooks. After the resin is laminated, resin islands 27 are first solidified and the product 10a is then spooled to form a wound roll 35 that can be used as a dispenser roll in a process similar to the one illustrated in FIG. 1. For example, instead of supplying a substrate 14 to the apparatus shown in FIG. 1, laminated product 10a can be supplied to be molded in the molding nip to form the fastener product 10 in FIG. 1. When introducing the laminated product 10a into the nip of the apparatus shown in FIG. 1, the solidified islands 27 can be melted prior to molding. For example, as the product 10a moves along processing direction 24 and before resin islands 27 enter molding nip 30, the solidified islands 27 can be melted by the heated wire 28 and/or heat source 34 to a desired temperature that allows the resin to fill the molding cavities.

Figure 6:
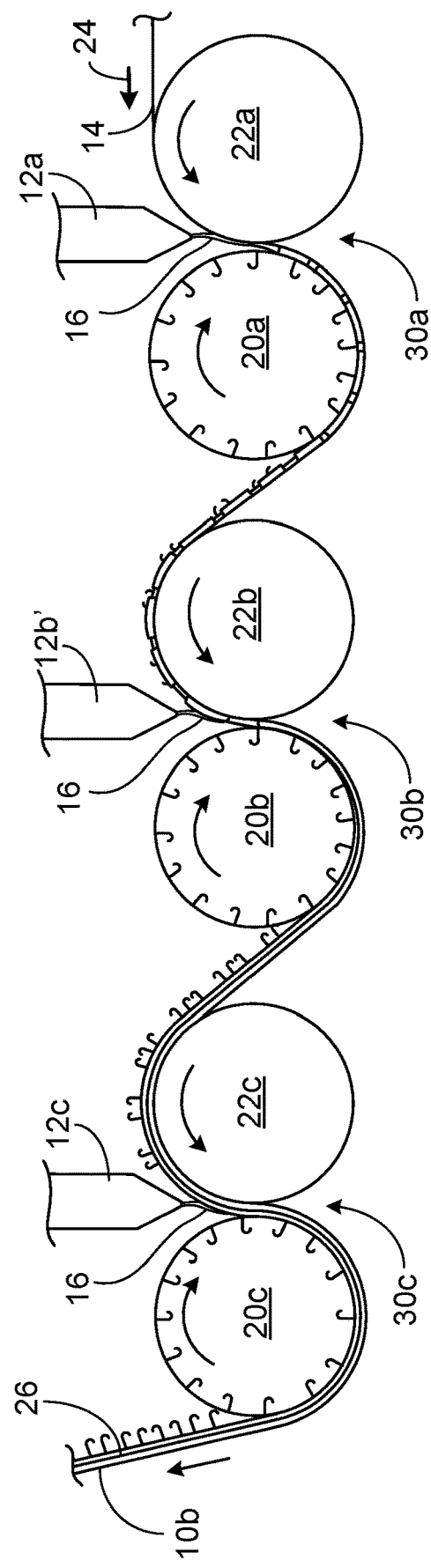
FIG. 6 is a schematic illustration of an apparatus and method for molding resin islands on a flexible substrate according to a second implementation.

Referring to FIG. 6, a different example of a method and apparatus for forming a faster product 10b features multiple resin sources 12a, 12b', and 12c arranged to introduce resin into respective pressure nips 30a, 30b, and 30c. In this example, resin is introduced in successive pressure nips formed between respective pressure rolls 22a, 22b, 22c, and mold rolls 20a, 20b, 20c. A second pressure nip 30b is downstream of a first pressure nip 30a and upstream of a third pressure nip 30c. Each of the pressure rolls and mold rolls define and are rotatable about a respective rotation axis (not shown). Each of the pressure rolls and mold rolls can be arranged such that their rotation axes are parallel and together define a common plane containing each of the rotation axes. Similar to the method described with respect to FIG. 1, a first resin source 12a deposits a first quantity of resin 16 at a first deposition location (e.g., at the first nip 30a) along the processing direction 24, and a second resin source 12b' deposits a second quantity of resin at a second location (e.g., second nip 30b) along the processing direction. A third quantity of resin 12a is further deposited at a third location (e.g., third nip 30c) along the processing direction.

Figure 7A:
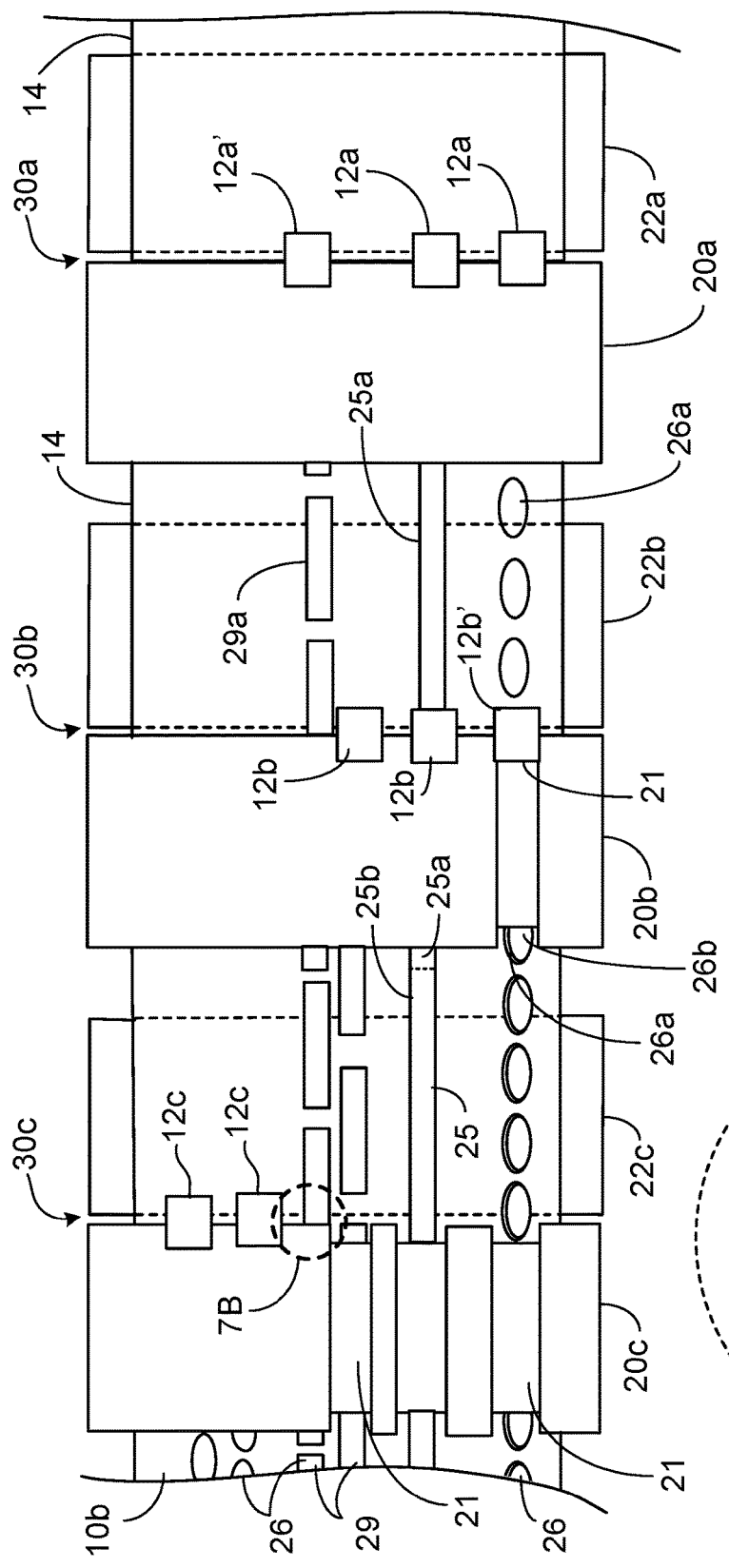
FIG. 7A is a top view of the apparatus of FIG. 6.

Referring also to FIG. 7A, one or more resin sources can introduce resin at each pressure nip to form resin regions such as resin lanes 25 or resin islands 26 (e.g., patches or strips 29). For example, two resin sources 12a and 12a' are positioned above the first pressure nip 30a, three resin sources 12b and 12b' are positioned above the second pressure nip 30b, and two other resin sources 12c are positioned above the third pressure nip 30c. Substrate 14 is first trained through first pressure nip 30a to be laminated to resin deposited into the nip by the first set of dispensers 12a, 12a'. As shown in FIG. 6, after resin is molded in the first pressure nip 30a and the resin is solidified, the resin (e.g., the array of fastener elements) is stripped from the molding cavities of mold roll 20a and trained through the second pressure nip 30b where the second dispensers 12b and 12b' drop molten resin into nip 30b on a different location of the substrate 14 to be molded with substrate 14. Resin molded in the second pressure nip 20b is again solidified and tripped from the molding cavities of the second mold roll 20b to train the substrate through the third pressure nip 30c. Resin is again deposited unto a different location of the substrate 14 by resin sources 12c to be molded and laminated to the substrate.

As shown in FIG. 7A, all or some of the resin sources can be offset with respect to each other to form resin islands on different regions of a broad surface of the substrate 14 in a cross-machine direction of the substrate. For example, the resin sources 12b and 12b' of the second pressure nip 30b can form resin strips 29 and lane 25 on a first half of the substrate 14 and the resin sources 12c of the third nip 30c can form islands 26 or lanes on a second, different half of the substrate. Each resin source can form different shapes of islands or continuous lanes. For example, resin islands 26 can be formed as patches or strips 29, and resin lanes 25 can be formed as longitudinally continuous lanes. In some cases, a resin source of the second or third pressure nip can mold resin on top of a previously molded resin island to overlay the island. In some examples, such resin source can form resin adjacent to a previously molded island/lane to form a continuous lane of different resins as pressure in the respective pressure nip expands the resin to connect the resin islands/lanes. For example, a resin source 12b' positioned above the second pressure nip 30b is controlled to deposit resin over the solidified resin islands 26a formed in the first pressure nip 30a. Resin source 12b' forms resin islands 26b that overlay the first set of resin islands 26a. In some cases, to better mold resin on top of islands 26a, the islands 26a formed in the first nip can have a flat surface without fastener elements, as described above with respect to FIG. 5. Additionally, two resin sources can form a longitudinally continuous resin lane 25 made of strips linked together. For example, a middle resin source 12a in the first pressure nip 30a can form a resin strip 25 of a first resin material 25a and a middle resin source 12b of the second pressure nip can form a second resin strip adjacent to the first strip to form a longitudinally continuous resin lane. The second resin strip can include a second resin material 25b that is different from the resin material of the first resin strip and/or can have a different shape or different fastener elements than the first resin strip. In some examples, the resin deposited in the first nip includes a different material or has different properties than the resin deposited in the second or third molding nip. In some implementations, each mold roll 20a, 20b, and 20c has different cavities that form different fastener elements (e.g., J-shaped or mushroom-shape fastener elements) in each pressure nip. In some examples, specially-patterned screens (not shown) disposed about a periphery of the mold roll define different patterns of cavities, or shapes of cavities, in different areas of the mold roll to form different shapes or densities of fastener elements on different parts of the substrate from similar resin depositions.

Additionally, the second mold roll 20b and the third mold roll 20c may define circumferential grooves 21 that correspond with a location of previously molded islands 26 and 29 to allow the molded hooks to pass the pressure nip without being deformed or bent. For example, the mold roll 20c that forms the third pressure nip defines multiple circumferential grooves 21, each aligned with respective islands 26 and 29 formed in the first nip 30a and second nip 30b such that, as the substrate approaches the third nip, the resin projections (not shown) of islands 26 and 29 are disposed within respective grooves of mold roll 20c.

Molding resin on a wide substrate 14 using multiple, successive nips allows the molding pressure to be distributed over multiple rolls to avoid roll deflection over wide products. For example, as shown in FIG. 7A, the fastener product 10b is a wide fastener product that features multiple rows or series of islands 26 and 29 formed across the width of a substrate 14. In a configuration where multiple resin dispensers introduce resin into a single nip to form product 10b, the pressures required to mold resin at multiple locations along the same nip can cause the mold roll and pressure roll to bend, causing the nip gap to be uneven. By molding resin in fewer locations of each nip, the pressure at each nip decreases, allowing the respective mold rolls and pressure rolls to last longer and produce better results.

Still referring to FIG. 7A, the resin dispensers can be controlled to form resin islands in a staggered configuration. For example, a third resin source 12b in second nip 30b can deposit resin to form resin strips 29 that are formed in alternating intervals with respect to the strips 29a formed by resin source 12a', to form resin strips in a staggered configuration along the cross-machine direction of the substrate. In some cases, resin sources 12b can dispose resin simultaneously to form aligned resin lanes or patches. Additionally, the resin sources 12b of the second nip can be controlled to form resin strips aligned with the resin strips 29a formed in the first pressure nip 30a.

Figure 7B:
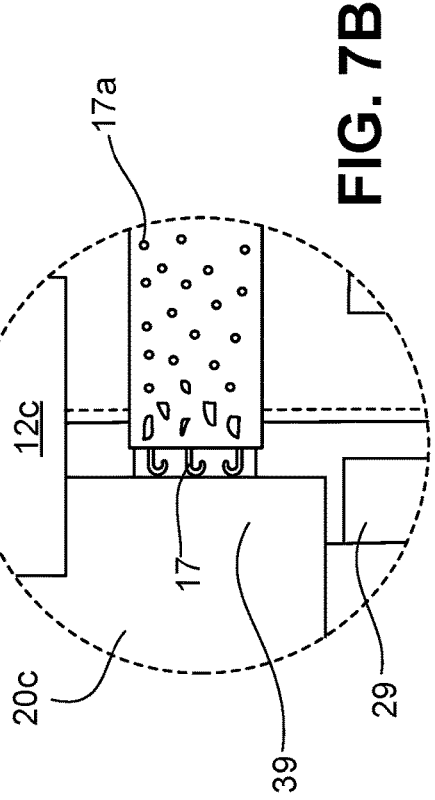
FIG. 7B is a detail view of a portion of the apparatus of FIG. 7A, taken at line 7B-7B in FIG. 7A.

Referring to FIG. 7B, the mold roll 20c forming the third pressure nip 30c has a peripheral surface 39 that knocks-down or deforms the resin projections 17a (e.g., resin stems) formed in the first nip 30a to form overhanging heads of fastener elements 17 or to flatten fastener hooks to even out the array of hooks.

Figure 8:
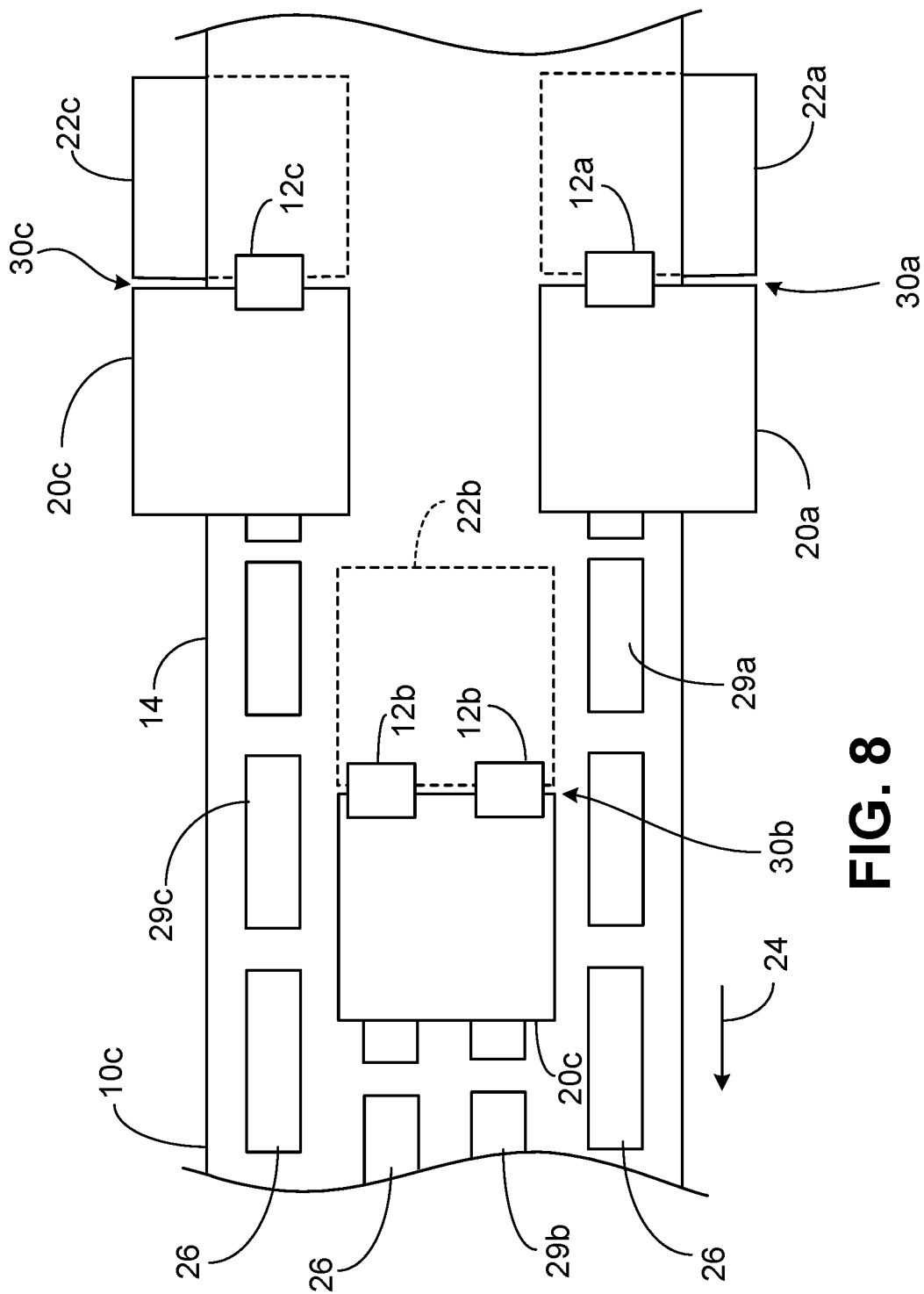
FIG. 8 is a top view of an apparatus and method for molding resin islands on a flexible substrate according to a third implementation.

Referring now to FIG. 8, a method and apparatus for forming a fastener product 10c is similar to the method described above with respect to FIG. 7A, with the exception of using shorter rotatable rollers instead of mold rolls that have circumferential grooves. For example, the rotatable rollers used in this example have a length that is less than a width of the substrate such that, as resin is molded on a portion of the substrate, only a portion of the substrate (along its width) is trained through pressure nips while another of the substrate remains exposed. For instance, the portion of the substrate that carries resin islands 26 (e.g., resin strips 29a) formed in a first molding nip 30a can move along the processing direction 24 without being trained through a successive molding nip 30b. In this example, the substrate 14 is first introduced simultaneously into two pressure nips 30a and 30c aligned along the width of the substrate, to be molded in two different regions across its width. The resin strips 29a formed in the first molding nip 30a and the resin strips 29c formed in the third molding nip 30c move along the processing direction 24 without being trained through an additional molding nip. As the formed strips 29a and 29c move along the processing direction, a central region of the substrate is trained through a second pressure nip 30b to form two sets of resin strips 29b. Two resin sources 12b are positioned above the second molding nip 30b to form resin strips 29b.

FIG. 9A shows a method and apparatus for forming a double-sided fastening product 10d with fastener elements on two broad sides of the product. For example, in a vertical-stack configuration of three rotatable rolls, two adjacent mold rolls 20a and 20b form a pressure nip 30b, and the middle mold roll 20 forms an additional pressure nip 30a in cooperation with a pressure roll 22. Resin 16 is first introduced into the first pressure nip 30a to form a first resin base layer 15a with fastener elements extending therefrom. As the molded resin moves on the surface of the mold roll 20a away from the first nip 30a and toward the second nip 30b, a second stream of molten resin 16 is dispensed by resin source 13 on a back side of the resin base 15a, opposite the previously formed fastener elements. The resin deposited on the second nip 30b is molded and laminated to the back side of resin base 15a to form a second resin base layer 15b with fastener elements facing away from the fastener elements of the first resin base layer 15a. As the first resin base layer 15a passes the second nip 30b, the fastener elements extending from the first resin base layer 15a are pulled out from the cavities of the first mold roll 20a. After the second resin base layer is solidified on the surface of mold roll 20b, the fastener elements extending from the second resin base layer 15b are stripped away from the cavities of the second mold roll 20b to be wound or further processed as a fastener product 10d with fastener hooks extending away from two broad sides of the product. In some examples, one of the two mold rolls 20a and 20b can have embossing features to form a fastener product 10d with one side having an embossed surface. In some implementations, first resin source 12 can deposit a continuous stream of resin to form a longitudinally continuous lane, and second resin source 13 can deposit interrupted streams of resin to form discrete resin regions or islands laminated to a back side of the resin lane. In some cases, the first resin source can deposit interrupted streams of resin to form resin islands and the second resin source can, by a registering process (e.g., including a registering sensor), deposit interrupted streams of resin between the islands formed in the first nip 30a to form resin islands that link together the previously-formed resin islands, forming a longitudinally continuous product of connected resin islands. For example, referring also to FIG. 9B, a touch fastener product 10e can be formed with resin islands 126a formed in the first nip 30a and second resin islands 126b formed to overlay a gap between the first islands 126a and bonded together at the second nip 30b to form connections 124 between the first and second resin islands. Additionally, a substrate 14 can be introduced to form the two resin base layers 15a and 15b on opposite sides of the substrate. For example, resin 16 can be laminated to a first broad side of substrate 14 in first nip 30a, and then resin can be laminated on a back side of the substrate in second nip 30b to sandwich the substrate between the two resin base layers 15a and 15b.

Referring now to FIG. 9C, a process and method for forming a similar product 10f to the product of FIGS. 9A and 9B features two rotatory rolls 120a and 120b forming a pressure nip 130 therebetween. Both rolls 120a and 120b can be mold rolls, or only one of the two rolls can be a mold roll and the other a pressure roll. Two resin sources 12 and 13 deposit resin regions 18 and 18' (e.g., discrete islands) respectively in different regions of roll 120a to form a series of islands that can be molded to form a continuous touch fastener product. For example, first dispenser 13 forms first islands 18 of resin at a first location on a surface of roll 120a. The first islands 18 are spaced apart in a processing direction, leaving a gap 122 between each other. As the first islands 18 are advanced by roll 120a toward nip 130, second dispenser 12 forms second islands 18' of resin at a second location between the first islands to overlay the gap 122 between the first islands 18. In some cases, the second islands 18' can contact the first islands 18 before the islands are passed through nip 130. The first and second islands 18 and 18' are then passed through nip 130 to force resin of the islands into molding cavities to form a respective array of resin projections extending from a resin base of each or some of the islands. As the islands 18 and 18' pass through nip 130, the resin islands are spread out by pressure at the pressure nip 130 to join the islands, forming connections (e.g., permanent connections) between the first and second islands. After such connections are formed and the resin is solidified on the surface of roll 120b, the resin can be stripped from roll 120b as a continuous touch fastener product 10f.

In some implementations, at least one of the resin dispensers 12 and 13 can deposit resin directly onto the surface of mold roll 120b. In some examples, a substrate 14 can be trained through nip 130 and at least one of the resin dispensers 12 and 13 can deposit resin directly onto the surface of the substrate 14. In some additional cases, resin sources 12 and 13 can be positioned offset with respect to each other to form resin islands or lanes that are offset along a cross-machine direction of the substrate. For example, first resin dispenser 13 can form first longitudinally continuous lanes (not shown) of resin and second resin dispenser 12 can form longitudinally continuous lanes that are spaced from the first lanes in a lateral direction, perpendicular to the processing direction.

Figure 10:
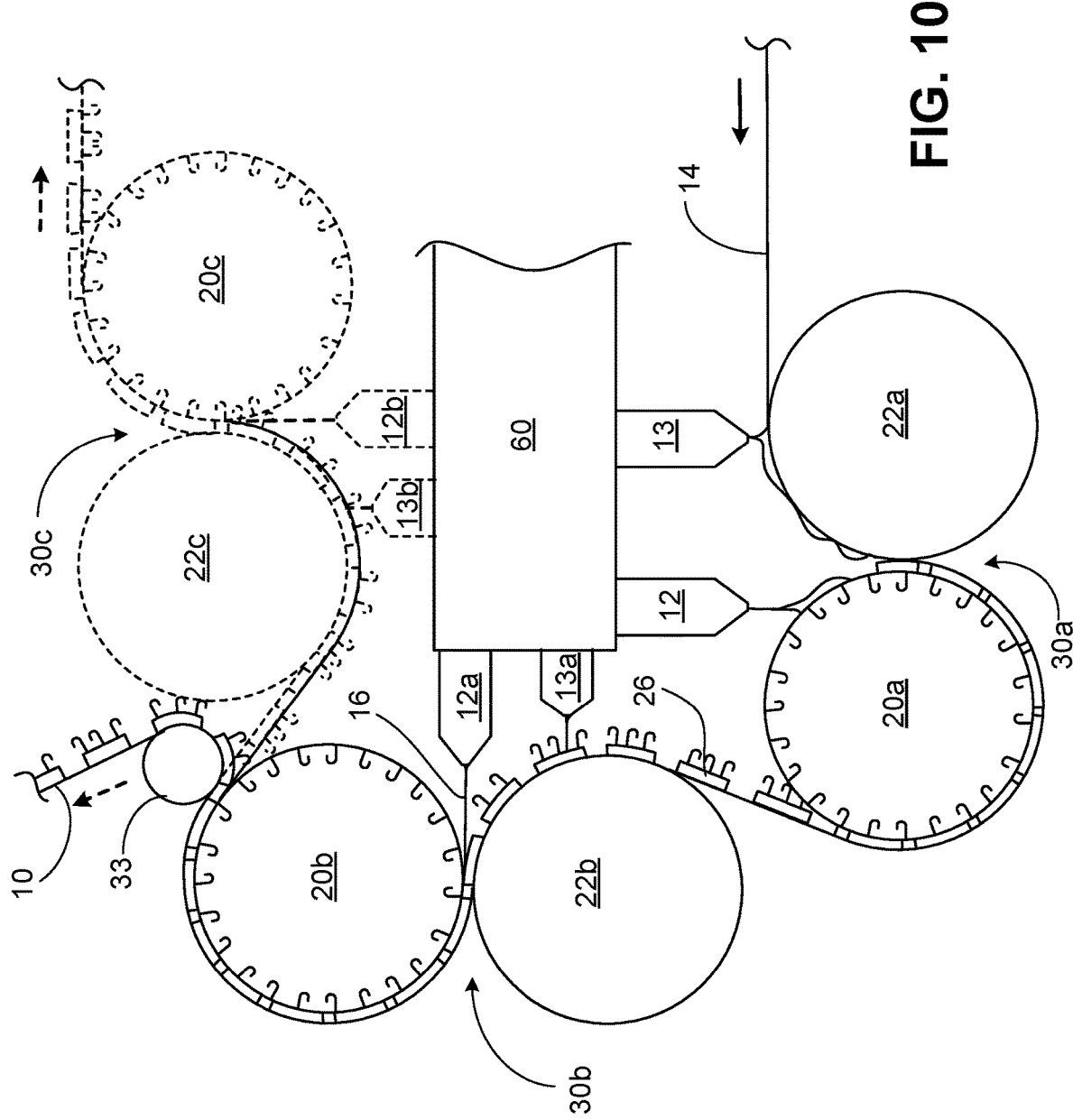
FIG. 10 is a schematic illustration of an apparatus and method for molding resin islands on a flexible substrate according to a fourth implementation.

Referring to FIG. 10, a method and apparatus featuring successive pressure nips similar to the apparatus of FIG. 7 has a common manifold 60 from which multiple resin sources extend. The resin sources dispense molten resin 16 on pressure nips formed by rollers arranged in an L-stack configuration. The substrate 14 is trained through a first pressure nip defined between a mold roll 20a and a pressure roll 22a positioned in a horizontal configuration (e.g., with their rotation axes aligned in a horizontal plane). Similar to the configuration of FIG. 1, a first set of spaced-apart resin dispensers 12 and 13 deposit interrupted streams of resin onto the substrate 14 to be molded in pressure nip 30a. The resin sources of manifold 60 can dispense resin 1) directly into the pressure nip (see resin source 12a), 2) upstream of the pressure nip onto the substrate (see resin source 13), or 3) onto the surface of the mold roll 20a (see resin source 12). The resin 16 is laminated to the substrate in nip 30a and, after being solidified and stripped from the mold roll 20, is advanced to a second pressure nip 30b where additional resin 16 is deposited on different portions of the substrate (or above the already formed resin islands 26) by a second set of resin dispensers 12a and 13a. Resin dispensers 12a and 13a can extend in a horizontal direction and can form an obtuse angle with the first resin sources 12 and 13, respectively. In some cases, each of the resin sources can be positioned at different angles depending on the position and size of the mold rolls and pressure rolls. The second pressure nip 30b is formed between two vertically stacked rotatable rolls 20b and 22b that, in cooperation with the first set of rotatable rolls 20a and 22a, form an L-stack configuration of rolls. A strip roll can strip off the fastener product 10a from the peripheral surface of the second mold roll 20b. In an alternative configuration, more resin sources 12b and 13b can extend from the same manifold 60 to supply resin to addition pressure nips such as a third pressure nip 30c disposed downstream of the second pressure nip 30b and defined between rotatable rolls 20c and 22c. In some examples, only one resin source per pressure nip disposes molten resin 16.

Referring to FIGS. 11 and 12, a pressure shoe 40 having a generally stationary outer surface can be used instead of a pressure roll to form a pressure nip 30a with rotatable roller 23. The rotatable roller 23 can be a mold roll or a pressure roll. In some examples, the pressure shoe 40 is a flexible and compliant wiper that, when roll 23 is a mold roll, flexes in nip 30a to force resin 16 to enter and fill exposed molding cavities under pressure and under the Kopanski effect. For example, the Kopanski effect is referred to herein as a churning of the resin caused by a velocity gradient and shear gradient formed in the resin moving between a stationary and a moving surface. As the shoe 40 forces resin 16 into the cavities of mold roll 23, excess resin forms a base 15, interconnecting the filled cavities that form the fastener elements. By using a stationary pressure surface or shoe 40, a part of the substrate can be melted by the introduced resin to strengthen the product and form one or more bands of resin 42 in form of transparent 'windows' with fastener elements. For example, the substrate comprises a material that can be melted (e.g., a non-woven substrate) such as a spunbond sheet 14. With a spunbond sheet, a fastening product that has a longitudinal window 42 of resin can be formed, by continuously melting a portion of the sheet when laminating the resin to the sheet. The melted portion of the substrate mixes with the resin forming resin base 15 that links the two unmelted sides of the substrate. The resin 16 migrates to a back surface of the substrate to form wings 44 under the substrate extending from the resin window 42. The resin wings 44 are laminated to the back of a respective, unmelted section of the substrate. In some examples, instead of forming a longitudinally continuous window, streams of resin can melt the substrate to form resin patches or islands (not shown) in form of discrete windows bounded by unmelted portions of the substrate. Further details of the process of forming a window by melting the substrate can be found in U.S. Application No. 62/608,622, entitled "Molding Resin to Form Continuous Structures," the entire contents of which are incorporated by reference herein. After forming the window 42, the second quantity of resin can be deposited by a second dispenser 12b over the window 42 of resin to form islands (e.g., strips) or lanes of resin 46 overlaying the resin window 42.

Figure 13:
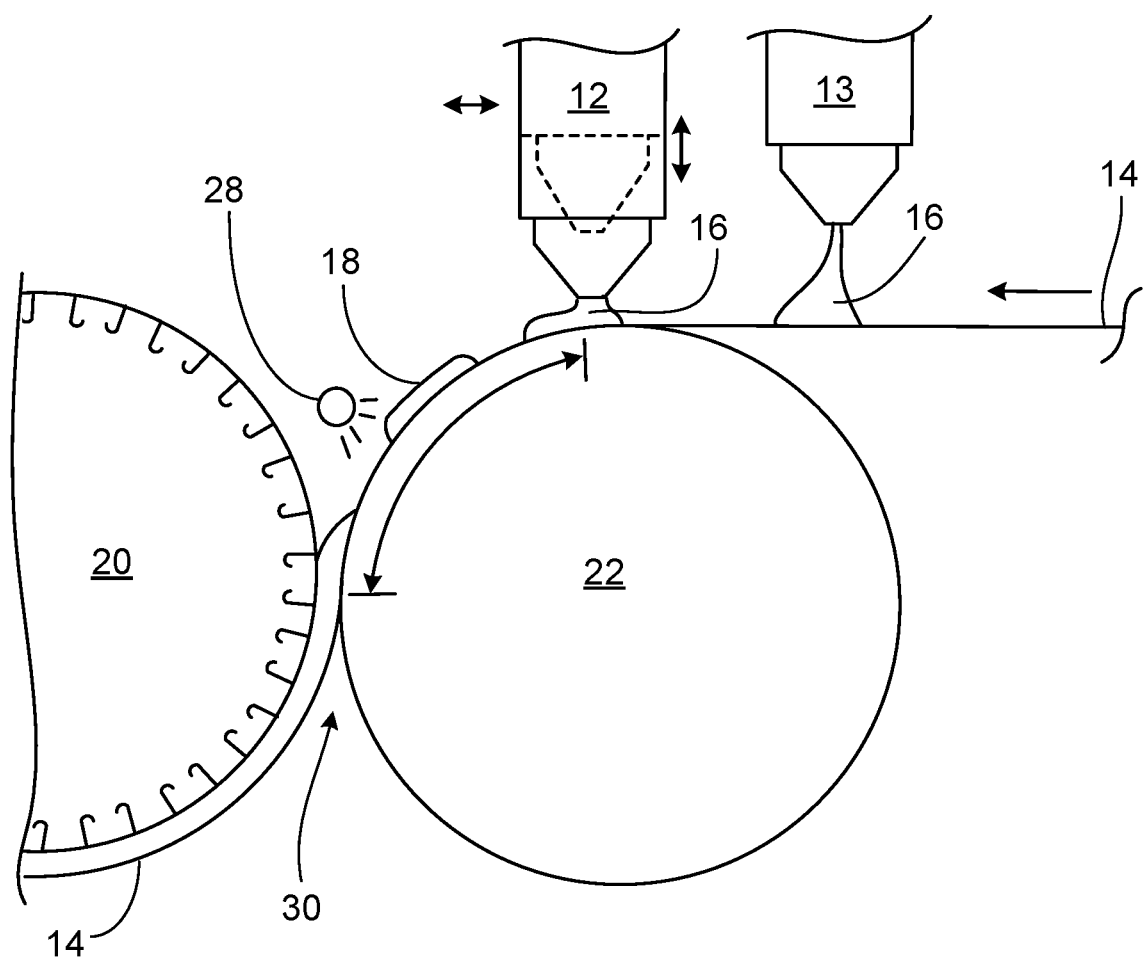
FIG. 13 is a schematic illustration of a portion of an apparatus for molding resin islands on a flexible substrate.

Referring to FIG. 13, resin dispensers 12 and 13 are independently movable with respect to proximity to the substrate 14 and with respect to proximity to each other. At a processing speed of about 200 FPM (70 MPM) and resin dispensed at about 215.5° C., a wrap distance 'd' or arc length between a resin source 13 and the pressure nip can be 3 inches (76.2 millimeters) or more and still allow the resin to reach the pressure nip in a molten state without needing to heat the resin to be molded. When resin is deposited on the mold roll, the resin can be deposited at a distance from the molding nip defined by a circumference angle of the mold roll (not shown) of between 20 and 30 degrees. The resin dispensers 12 and 13 can have a width of about 1.5 inches (38.1 millimeters) and are preferably spaced apart from each other a distance between 0 and 10 inches (0 and 254 millimeters) to form staggered patches as shown in FIG. 4.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of molding resin on a flexible substrate, the method comprising:
    forming discrete regions of resin; and
    forcing resin of at least some of the regions into molding cavities to form a respective array of resin projections extending from a resin base of the at least some of the regions;
    wherein forming the discrete regions of resin comprises depositing molten resin directly onto either the substrate or a surface in which the cavities are defined, the resin deposited as the substrate moves in a processing direction, and wherein the resin is deposited by resin sources spaced from each other along the processing direction;
    wherein forming the discrete regions of resin comprises depositing molten resin directly onto the substrate, and wherein the resin is forced into the cavities in one or more molding nips defined against one or more mold rolls in which the cavities are defined; and
    wherein forming discrete regions of resin on the flexible substrate and forcing resin of the regions into molding cavities comprises:
        depositing a first quantity of resin at a first deposition location along the processing direction;
        depositing a second quantity of resin at a second deposition location along the processing direction to overlap the first quantity of resin; and then
        passing the substrate through a pressure zone in which pressure applied through the substrate forces resin from at least one of the first and second quantities of resin into the molding cavities.

2. The method of claim 1, wherein forming the discrete regions of resin comprises depositing interrupted streams of molten resin.

3. The method of claim 2, wherein the discrete regions of resin comprise discrete resin islands spaced from each other in the processing direction.

4. The method of claim 1, wherein the discrete regions of resin comprise longitudinally continuous resin lanes spaced from each other in a lateral direction, perpendicular to the processing direction.

5. The method of claim 1, wherein forming the discrete regions of resin comprises depositing molten resin directly onto the substrate and then introducing the deposited resin to a mold roll defining the molding cavities.

6. The method of claim 1, wherein the resin sources are offset with respect to each other, and wherein forming discrete regions of resin comprises forming regions staggered along a lateral direction of the substrate, perpendicular to the processing direction.

7. The method of claim 1, wherein forming the discrete regions of resin comprises depositing interrupted streams of resin by resin sources spaced from each other along a lateral direction, perpendicular to the processing direction.

8. The method of claim 1, wherein the resin projections comprise fastener elements.

9. The method of claim 1, wherein each resin source of the resin sources is independently movable with respect to proximity to the substrate.

10. The method of claim 1, wherein a resin deposited by a first resin source of the resin sources comprises a different density than a resin deposited by a second resin source of the resin sources.

11. The method of claim 1, further comprising, before forcing resin of the regions into the molding cavities, heating the resin to maintain the resin at a desired temperature until the resin is forced into the molding cavities.

12. The method of claim 11, wherein forming the discrete regions of resin comprises depositing molten resin directly onto the substrate, and wherein the method further comprises, before forcing resin of the regions into the molding cavities, cooling the resin to mechanically secure resin to the substrate, and winding the flexible substrate to form a wound roll.

13. The method of claim 1, wherein depositing molten resin onto the substrate comprises depositing molten resin onto the substrate before the resin contacts the one or more mold rolls.

14. The method of claim 1, wherein each of the one or more molding nips is defined between a mold roll and a respective reaction surface.

15. The method of claim 14, wherein the reaction surface comprises a counter-rotating pressure roll.

16. The method of claim 14, wherein the reaction surface comprises a pressure shoe having a generally stationary outer surface.

17. The method of claim 1, further comprising, after forcing resin of the regions into the molding cavities:
solidifying resin of the regions in the filled molding cavities; and
stripping the solidified resin of the regions from a peripheral surface of the one or more mold rolls by pulling the projections from their cavities.

18. The method of claim 1, wherein the cavities are filled with resin from only the second quantity of resin.

19. The method of claim 1, wherein resin from both the first and second quantities of resin is forced into molding cavities in the pressure zone.

20. The method of claim 1, wherein resin from the first quantity of resin is forced exclusively into a first set of the molding cavities, and resin from the second quantity of resin is forced exclusively into a second set of the molding cavities.

21. The method of claim 1, wherein the pressure zone is defined in the molding nip, the molding nip being defined between a pressure roll and a mold roll in which the cavities are defined.

22. The method of claim 21, wherein the pressure zone is defined between the mold roll and a belt supported by the pressure roll to engage the mold roll through resin in the pressure zone.

23. The method of claim 21, further comprising, before forcing resin of the regions into the molding cavities, heating the first and second quantities of resin to maintain the resin at a desired temperature until resin from at least one of the first and second quantities of resin is forced into the molding cavities.

24. The method of claim 23, wherein heating the first and second quantities of resin comprises heating the pressure roll to transfer heat from the pressure roll to the resin through the substrate.

25. The method of claim 24, wherein the resin is in contact with the mold roll through a circumference angle of at least 180 degrees.

26. The method of claim 23, wherein heating the first and second quantities of resin comprises heating the substrate upstream of initial contact between the substrate and the pressure roll.

27. The method of claim 23, wherein heating the first and second quantities of resin comprises using a heat source disposed over the first and second quantities of resin, opposite the pressure roll.

28. The method of claim 1, wherein
the pressure zone comprises a second pressure zone, the method further comprising, after depositing the first quantity of resin and before depositing the second quantity of resin,
passing the substrate through a first pressure zone in which pressure applied through the substrate forces resin from the first quantity of resin into a first set of molding cavities.

29. The method of claim 28, wherein the first and second pressure zones are defined in respective first and second molding nips, each molding nip being defined between a reaction surface and a mold roll in which the cavities are defined.

30. The method of claim 29, wherein the mold roll defining the second molding nip is configured to knock-down resin projections formed in the first molding nip.

31. The method of claim 29, wherein the mold roll defining the second molding nip defines a circumferential groove along its periphery such that, as the substrate approaches the second molding nip, resin projections formed in the first molding nip are disposed within the groove.

32. The method of claim 29, wherein depositing a first quantity of resin comprises depositing a third quantity of resin at a third location aligned with the first location along the processing direction, and wherein passing the substrate through a first pressure nip comprises passing the substrate through a third pressure nip aligned with the first pressure nip.

33. The method of claim 32, wherein the third pressure nip is defined in a third molding nip, the third molding nip being defined between a third reaction surface and a third mold roll spaced apart from a mold roll of the first molding nip.

34. The method of claim 28, wherein depositing the first quantity of resin comprises depositing resin onto a first side of the substrate, and wherein depositing the second quantity of resin comprises depositing resin onto a second side of the substrate, opposite the first side of the substrate.

35. The method of claim 28, wherein the regions of resin are formed in a symmetrical arrangement with respect to a central axis of the substrate extending parallel to the processing direction.

36. The method of claim 28, wherein forcing the resin into the molding cavities comprises continuously melting a portion of the substrate in the first molding nip, such that the molten resin and the melted portion of the substrate together form a band of resin free of meld lines, and wherein depositing a second quantity of resin comprises depositing resin over the band of resin.

37. The method of claim 28, wherein passing the substrate through the first pressure zone comprises laminating resin from the first quantity of resin to the substrate and leaving resin of the laminated resin unmolded, and wherein the second quantity of resin is deposited to overlap the unmolded resin.

38. A continuous method of forming a touch fastener product, the method comprising:
sequentially forming first regions of resin at a first location along a processing direction, such that the first regions of resin are spaced apart in the processing direction to define gaps therebetween;
forming second regions of resin at a second location downstream from the first location along the processing direction, the second regions of resin overlaying the gaps defined between the first regions of resin;
forcing resin of at least some of the regions into molding cavities of a rotating mold roll to form resin projections;
joining the first and second regions to form a longitudinally continuous strip of resin; and then
removing the longitudinally continuous strip of resin from the mold roll by stripping the projections from the cavities.

39. The continuous method of claim 38, wherein forming the first regions of resin comprises forming discrete islands of resin spaced from each other in the processing direction.

40. The continuous method of claim 38, wherein forming the first regions of resin comprises forming longitudinally continuous lanes of resin spaced from the second regions of resin in a lateral direction, perpendicular to the processing direction.

41. The continuous method of claim 38, wherein forming the first regions of resin comprises depositing resin directly onto a substrate.

42. The continuous method of claim 38, wherein forming the first regions of resin comprises depositing resin directly onto a surface of the mold roll.

43. The continuous method of claim 38, wherein forcing resin of the at least some of the regions into the molding cavities comprises introducing the resin into a pressure nip comprising the mold roll.

44. The continuous method of claim 38, wherein forming the second regions of resin comprises forming regions of resin that contact the first regions of resin.

* * * * *